Patented Nov. 28, 1922.

1,436,819

UNITED STATES PATENT OFFICE.

HERMANN PLAUSON, OF HAMBURG, GERMANY.

PROCESS FOR THE MANUFACTURE OF DIOLEFINES AND POLYMERIZATION PRODUCTS.

No Drawing.   Application filed January 13, 1921.   Serial No. 437,108.

*To all whom it may concern:*

Be it known that I, HERMANN PLAUSON, Esthonian subject, residing in Hamburg, Germany, have invented certain new and useful Improvements in Processes for the Manufacture of Diolefines and Polymerization Products (for which I have made application in Germany, April 23, 1918), of which the following is a specification.

It is known that by passing a mixture of acetylene and propylene through red-hot tubes, it is possible to obtain small quantities of 1.3 butadiene together with other hydrocarbons.

According to the Annales de Chimie et Physique (4) vol. 9, page 466, and (5) vol. 10, page 186, only traces of diolefines are formed, together with other hydrocarbons.

It has been attempted to increase the formation of diolefines by contact agents, e. g., Comptes Rendues, vol. 132, pages 599 to 608, and Friedlander, Forschritte, vol. 11, page 829, but even then the yields so obtained are too small for practical operation.

Now it has been found that the yield can be essentially increased if molecular quantities of acetylene and ethylene are allowed to interact for a suitable time at a sufficiently high pressure and temperature or pressure alone.

Experiments on these lines have further shown that catalytically active substances can favourably influence the course of the reaction, and that by using such agents in the same way, it is possible to condense allylene with ethylene and propylene with acetylene to yield diolefine hydrocarbons.

Finally it has been found that by gradually increasing the pressure and the temperature or increasing the time of interaction, it is possible to obtain a polymerization of the diolefine so formed in a single operation.

It has hitherto not been known that the application of pressure influences the reaction between unsaturated hydrocarbons of the ethylene and acetylene series in such manner that diolefines could be obtained with a good yield. It is also new to polymerize the diolefines so formed in a single operation at the moment of their formation.

A proposal has been made to condense acetylene with methane (which is a saturated hydrocarbon) under pressure with the aid of a contact agent to form an unsaturated hydrocarbon, viz., propylene, but firstly this suggestion would not lead to the conclusion that acetylene could be condensed with olefines under pressure direct to yield diolefines in satisfactory quantities, because unsaturated hydrocarbons containing a double bond behave differently from saturated hydrocarbons such as methane, and secondly, it could not have been foreseen that diolefines would be formed by the present process in a high state of purity which is of the utmost importance as regards their practical application for rubber synthesis.

It has of course been proposed to polymerize diolefines to rubber-like substances by heating, but the process according to the present invention is entirely novel in that diolefines prepared in a particular manner are polymerized in the nascent state by increasing the pressure and the temperature or by prolonging the time of interaction. It could not have been foreseen that diolefines would be formed in a high state of purity in the above reaction. Now according to previous experiences, it was always necessary to employ very pure diolefines if useful polymerization products were to be obtained and it could not have been foreseen that diolefines could be polymerized to yield useful products without further purification. It has been found however that this is indeed possible and practicable in a technical manner. The process will be understood more clearly by considering the following examples.

*Example 1.*

A mixture of equal volumes of acetylene and ethylene is forced by a compressor at a pressure of 3–15 atmospheres into a long thick-walled spiral or zig-zag steel tube (about 3–5 metres long). This is surrounded by a steel mantle through which steam, superheated to 350–450° C., is passed. A non-return valve is provided at the inlet of the gas into the spiral tube and an outlet-valve is provided which can be externally regulated to any desired pressure from 1–50 atmospheres.

Internal pressure is developed in the tube through heating and if this increases above 5 atmospheres for example and if the outlet valve is loaded to this pressure, part of the gas escapes. If now the pressure generated by the compressor is 5½ atmospheres for example, fresh quantities of the gas mixture can be forced through the non-return valve. It is thus possible to admit smaller or larger quantities in the same time.

The gases which escape are passed into a distillation apparatus with tubes and are first cooled with water and then in a freezing machine to 20° C. The 1.3 butadiene and the higher boiling hydrocarbons are thus condensed while unchanged acetylene and ethylene are led back in the gaseous state to the compressor by a smaller pump so that they can be again subjected to the process. The liquefied 1.3 butadiene is purified by distillation in suitable apparatus and either stored in bombs or directly treated for the manufacture of rubber.

If the operation is performed at 5 atmospheres pressure in the tube and 5½ atmospheres in the compressor, up to —20% of 1.3 butadiene can be formed by a single passage of the mixture of gas. In the apparatus described, the unchanged gases can be continuously subjected to the same operation and a yield of up to 85% of 1.3 butadiene can be obtained.

The condensation of acetylene and ethylene 1.3 butadiene can also be effected in presence of inert gases such as nitrogen or carbon dioxide or inert oxygen-free hydrocarbons such as benzene, toluene, xylene, benzine, petroleum, etc., by adding smaller or larger quantities of these substances preferably in the form of gas or vapour. The advantage of this procedure is that higher pressure can be employed without the danger of the acetylene exploding. The reaction-velocity is accelerated by application of higher pressures and the time of condensation is shortened.

At 5 atmospheres pressure and 400–450° C., 60 litres at most of 1.3 butadiene can be formed per hour in a given apparatus. At 30 atmospheres and in presence of 50% of nitrogen or benzene vapour however at a temperature of 250–300° C., about 600 litres per hour can be made in the same apparatus. Presumably the reaction-temperature can be still further decreased at still higher pressure.

It has further been demonstrated that by the use of certain substances as catalysts the pressure and the temperature or the time of reaction can be still further decreased. Such catalysts are oxides or hydroxides of the alkalis or alkaline earths and oxychlorides. The best results are given by anhydrous caustic alkalis although certain acids such as molybdic acid are also suitable.

*Example 2.*

Molecular proportions of allylene and ethylene are taken and the operation is performed otherwise as in Example 1 when a diolefine hydrocarbon of the net formula $C_5H_8$ is obtained which can be polymerized by metallic sodium to a rubber-like product. A yield of 8–12% is obtained by a single passage of the mixture allylene and ethylene through the apparatus and the total yield with continuous operation is about 75–78%.

*Example 3.*

A mixture of acetylene and propylene in molecular or approximately molecular proportions is treated as in Example 1 at a pressure of about 10 atmospheres and a temperature of about 350 to 450° C.

After a single passage through the apparatus, 3 to 8% of a diolefine hydrocarbon of the composition $C_5H_8$ is obtained which has a boiling point between 36 and 37° C. This product appears to be isoprene since it gives a rubber-like substance on treatment with sodium. By repeated passage through the reaction tube, it is possible to transform 60–70% of the gas mixture into isoprene. By using benzene or benzine vapour or indifferent gases as diluents, the yield of isoprene can be increased to 85%.

*Example 4.*

28 parts of ethylene, 26 parts of acetylene and 100 parts of benzene in the form of vapour are compressed and forced into an autoclave at 5–10 atmospheres. The autoclave is filled with caustic alkali in pieces or a mixture of alkali and sodium bicarbonate. The autoclave is first heated for 3–5 hours to 250–300° C. when the pressure rises to about 55–65 atmospheres. Heating is then continued for 10–15 hours at a temperature of 200–250° C. when the pressure steadily falls to about 12 atmospheres. After cooling, the uncondensed portion of the gas is allowed to escape and collected. In addition to 1.3 butadiene the chief product is a polymerized rubber-like substance together with intermediate polymerization products. After distilling off the benzene, and other hydrocarbons which may have been produced, by means of steam, and after treatment with weak acetic or formic acid followed by alkali, a rubber-like nervy mass is obtained with a yield of 25–35%; this mass can be rolled out into sheets very well. By about 24 hours further heating to 150–200° C., the yield can be increased to 45%.

The intermediate polymerization products which are obtained partly as liquids and partly as solids can be used as oil-varnish, and turpentine substitutes. Or they can be transformed by oxidation into resin-like products or again transformed into diolefines by pyro-chemical decomposition (up to 75%). Instead of mixtures of acetylene and ethylene, it is also possible to treat mixtures of allylene with ethylene and propylene with acetylene directly in an autoclave for condensation and polymerization to rubber-like substances or intermediate products. The polymerization can take place at a temperature of 200–250° C. if a sufficiently high pressure is employed. The quantities of the raw materials and the additions can be varied as desired.

It could not have been foreseen that the reaction temperature could have been lowered from 600–700° C. as used by Berthelot, to 400–450° C. by the application of pressure, and further that it was not only possible to form hydrocarbons of the butadiene series but that by discontinuous operation and sufficiently long reaction time, it was also possible to obtain a polymerization to rubber in a single operation, i. e., without intermediate purification.

It would not have appeared feasible to apply pressure hitherto because acetylene is known to be very explosive on heating even at a low pressure. It was all the more surprising therefore that the above mentioned gas mixtures did not explode at pressures up to 10 atmospheres and when heated to 350–450° C., but that on the contrary a condensation took place.

Still less could it have been foreseen that by addition of an inert gas such as nitrogen or carbon dioxide or liquid vapours such as benzene, benzine, petroleum, etc., it would have been possible to increase the reaction pressure to 30–50 atmospheres whereby the temperature of reaction and the time of reaction could be reduced. Further it could not have been foreseen that oxides or hydroxides of the alkali or alkaline earth metals or oxychlorides would accelerate the condensation and polymerization under the above described conditions.

The apparatus described above is particularly valuable for operation on the large technical scale since it makes it possible to operate continuously in a simple manner while obtaining a high yield.

Having now particularly described and ascertained the nature of my said invention and in what manner the same is to be performed, I declare that what I claim is:—

1. A process for the manufacture of hydrocarbons which includes the step of heating a mixture of gases of the ethylene and acetylene series at superatmospheric pressure.

2. A process for the manufacture of diolefines which comprises heating a mixture of gases of the ethylene and acetylene series at superatmospheric pressure in presence of a contact agent.

3. A process for the manufacture of diolefines which comprises heating a mixture of gases of the ethylene and acetylene series at superatmosphereic pressure in presence of inert gaseous bodies as diluents.

4. A process for the manufacture of diolefines which comprises heating a mixture of gases of the ethylene and acetylene series at pressures from two to ten atmospheres.

5. A process for the manufacture of diolefines which comprises heating a mixture of gases of the ethylene and acetylene series at superatmospheric pressure between two and fifty atmospheres.

6. A process for the manufacture of diolefines which comprises passing a mixture of gases of the ethylene and acetylene series into a heated reaction space maintained at a constant superatmospheric pressure and withdrawing reaction products therefrom in continuous operation.

7. A process for the manufacture of butadiene by heating a mixture of ethylene and acetylene at superatmospheric pressure.

HERMANN PLAUSON.

Witnesses:
  VICTOR COMSTON,
  W. H. BEESTON.